United States Patent [19]

Harmuth

[11] 4,320,048

[45] Mar. 16, 1982

[54] MELT-BLENDING METHOD OF FORMING PIGMENTED POWDER COATINGS

[75] Inventor: Charles M. Harmuth, Wilmington, Del.

[73] Assignee: E. I. Du Pont de Nemours and Company, Wilmington, Del.

[21] Appl. No.: 164,141

[22] Filed: Jun. 30, 1980

[51] Int. Cl.$^3$ .............................................. C08J 3/20
[52] U.S. Cl. .................................. 523/333; 264/101; 264/211; 523/340; 523/512
[58] Field of Search ............. 260/42.54, 42.28, 37 EP; 264/211, 101

[56] References Cited

U.S. PATENT DOCUMENTS

| | | | |
|---|---|---|---|
| 3,121,914 | 2/1964 | Olsonet et al. | 264/211 |
| 3,207,205 | 9/1965 | Briskin et al. | 264/211 |
| 3,560,430 | 2/1971 | Meyer et al. | 264/211 |
| 3,790,513 | 2/1974 | Victorius | 260/39 R |
| 4,006,209 | 2/1977 | Chiselko et al. | 264/211 |
| 4,065,532 | 12/1977 | Wild et al. | 264/211 |
| 4,122,060 | 10/1978 | Yallourakis | 260/37 EP |
| 4,247,501 | 1/1981 | Easley et al. | 264/211 |
| 4,250,132 | 2/1981 | Beach | 264/211 |

OTHER PUBLICATIONS

Mueller; Producing Colored Powders; Paint and Varnish Production, Apr. 1974.

*Primary Examiner*—Lewis T. Jacobs

[57] ABSTRACT

An improved method of forming a pigmented powder coating composition of the kind wherein the constituents are melt-extruded and the solidified extrudate then ground into a powder is provided. In the improved method, the non-pigment constituents are introduced into a melt-extruder and a pigment dispersion is simultaneously introduced into the extruder at a point downstream of the introduction of the non-pigment constituents. Powder coatings produced by this improved method display enhanced appearance and gloss.

2 Claims, No Drawings

MELT-BLENDING METHOD OF FORMING PIGMENTED POWDER COATINGS

BACKGROUND OF THE INVENTION

1. Field of the Invention

This invention relates to a method of producing pigmented powder coating compositions that have improved appearance. More particularly, it relates to an improved method of melt-blending the constituents of the powder coating.

2. Description of the Prior Art

Powder coating compositions, both with and without pigment, are well known and have been prepared by various methods. All methods have as their objective, of course, to obtain an intimate mixture, in dry, particulate form, of the film-forming materials and pigments that constitute the powder coating. Melt-blending or melt-extrusion has often been used in some stage of many of these methods.

One such method, as shown in U.S. Pat. No. 3,790,513 to Victorius, involves transforming what is essentially a solvent-based coating composition (polymeric resins, crosslinkers, pigment, various additives, all of which are in an organic solvent) into a powder by charging the composition into a vacuum extruder. With heat and vacuum applied, the solvent is removed while the non-volatiles mix and then melt. A 100% solids extrudate is produced which is then ground into a powder. Although powder coatings with good appearance can be produced by this method, the large amounts of solvent which must be removed makes the extruder operation troublesome and expensive, and can pose solvent emission problems.

Another method, shown in U.S. Pat. No. 4,122,060 to Yallourakis, involves charging the previously-blended dry constituents into a conventional melt extruder and then reducing the extrudate to a powder. The dry mixing of the pigment with the other constituents and the additional blending that takes place in the melt-extruder are often insufficient, however, to disperse the pigment uniformly throughout the powder coating. The non-uniform flow of the powder, during application, that can result in poor gloss and distinctness-of-image in the final coating is a disadvantage to the use of this method, especially when the coating is for an automotive topcoat.

Therefore, there remains a need for a melt-blending method of producing pigmented powder coating compositions that disperses pigment uniformly throughout the composition without emitting unduly large amounts of solvent.

SUMMARY OF THE INVENTION

There is provided by the present invention an improved method of forming a pigmented powder coating composition, the composition containing at least binder materials and pigment in a pre-determined pigment-to-binder weight ratio and the method being of the kind wherein the constituents are melt-extruded and the extrudate subsequently reduced to a powder, wherein the improvement comprises (a) introducing a major portion of the non-pigment constituents in substantially dry form into a melt-extruder, (b) introducing into the melt extruder a pigment dispersion comprising the pigment, the balance of the non-pigment constituents, and at least some, up to 60% by weight, based on the dispersion weight, of a volatile dispersing liquid, the liquid dispersion being introduced at a point downstream of the introduction of the constituents of (a) to mix therewith and being introduced at a rate that will produce an extrudate having the pre-determined pigment-to-binder weight ratio, and (c) removing the volatile liquid.

DETAILED DESCRIPTION OF THE INVENTION

The present invention is an improvement of one of the traditional methods, melt-extrusion, of blending the constituents of a pigmented powder coating composition. It has been found that powder coating compositions are more uniformly pigmented, and result in final coatings having improved gloss and appearance, when produced according to the present method.

In conventional methods using melt-extrusion, all constituents of the powder coating composition are introduced together into a melt extruder where melt-blending takes place. The extruder ultimately yields a mass (extrudate) of the blended material which, after its cooling and solidification, is reduced to a fine powder. The constituents are either introduced in a dry, particulate state or dissolved in a volatile liquid which is removed at some point from the extruder.

In contrast, the improved method of the present invention contemplates the introduction of two separate material feeds into the extruder. One such feed is of substantially all the constituents of the composition except the pigment. These constituents are normally introduced in dry, particulate form. The other feed is in the form of a conventional pigment dispersion or mill base and is the means by which all the pigment enters the composition. This second feed is introduced simultaneously with the first feed but at a point in the extruder downstream of the introduction of the first. The non-pigment constituents of the first feed have therefore already passed through a portion of the extruder, and are preferably at least partially melted and blended, before being contacted by and mixed with the pigment dispersion. The volatile dispersing liquid of the pigment dispersion is removed at a later stage of the melt-extrusion.

The method of the present invention, to be described in detail below, is applicable to the production of any pigmented powder coating composition. As referred to herein, the powder coating compositions to be finally produced are a blend, in fine particulate form, of binder materials, pigment, and optional additives.

The binder materials are film-forming resins, and curing agents for the resins. Suitable film-forming resins for powder coatings are, for example, epoxy resins that are poly-functional and therefore curable or crosslinkable to form the finished coating at conventional powder fusion temperatures. The most wellknown epoxy resins are formed by reacting epichlorohydrin and bisphenol-A, and have an epoxide equivalent weight of 400–1500. Other organic epoxides, such as 1,2,3,4-diepoxybutane, or other phenols, such as resorcinol, also form suitable epoxy resins. Aliphatic-based epoxy resins, such as those formed by reacting epichlorohydrin with glycerol, with ethylene glycol, or with pentaerythritol, can also be used. The curing agents, or crosslinkers as they may be called, effect the fusion of the resins into a smooth film after the powder is applied to the substrate to be coated. Examples are diamines, dicarboxylic acids or their anhydrides, or the mixed aromatic-aliphatic polyether shown with epoxy resins in U.S. Pat. No. 4,122,060 to Yallourakis.

Another suitable film-forming resin is an acrylic copolymer of glycidyl acrylate or methacrylate with other alkyl acrylates and methacrylates. These acrylic copolymer resins are fully described in U.S. Pat. No. 4,027,066 to Victorius. The copolymers can be prepared by conventional emulsion polymerization or by suspension or bead polymerization techniques as disclosed in W. R. Sorenson and T. W. Campbell, *Preparative Methods of Polymer Chemistry*, Interscience Publishers, New York, Second Ed. 1968. The polymers can be filtered from the dispersions in which they are formed and can then be dried. In this dry condition, the polymers are suitable for use in the method of the present invention. Curing of these resins is most advantageously done by incorporating aminoplast resins and dicarboxylic acids into the powder coating as curing agents.

It is to be understood that the above is meant only to exemplify a few of the binder materials amenable to processing into powder coatings by the improved method of the present invention. The method is not limited by the chemistry of the binder.

Examples of the pigments usable in the powder coatings are metallic oxides such as titanium dioxide, zinc oxide, and iron oxide; metallic flakes; metallic powders; metal hydroxides; sulfides; sulfates; and carbonates.

Other additives can also be used in the powder coatings. For example, fillers such as silica, barium sulfate, etc. can be added to improve abrasion resistance. Monomeric or polymeric plasticizers can also be included. Examples are cellulose acetate butyrate, hydroxyl-functional polyesters or polycaprolactones, or alkyl and cycloalkyl phthalate esters. Flow control additives such as silicone resins can also be used.

To accelerate the cure, one of the constituents of the final powder coating can be blocked acid catalyst. Usually, about 0.1-2% by weight, based on total binder weight, of a blocked paratoluene sulfonic acid is used. Usually the acid is blocked with a polyether hydroxy resin. One preferred such resin, which becomes part of the binder, is 3,4-epoxycyclohexylmethyl-3,4-epoxycyclohexane carboxylate, commercially available as ERL 4221.

The improved method of producing pigmented powder coatings that is provided by the present invention focuses on the melt-blending and extrusion of the constituents. This is most easily accomplished with a melt extruder, and it is the manner by which the constituents are charged into the extruder that is the subject of the present invention.

Aside from a small portion of film-forming resin that is used to prepare the pigment dispersion as described below, all constituents but the pigment (the non-pigment constituents) form one feed stream to the extruder and the pigment dispersion forms a second feed stream. The non-pigment constituents are preferably pre-blended before being charged into the extruder. Since most resins or additives useful in powder coatings are normally solid at room temperature and are each available in dry, particulate form, this pre-blending is usually accomplished through conventional dry-blending techniques. Although some of the constituents, such as the low molecular weight epoxy resins, are liquids at room temperature, they will usually be absorbed by the balance of the non-pigment constituents, which are dry, during the pre-blending. This first feed stream will therefore normally be of particulate solids.

The pigment dispersions, or mill bases as these may be called, that constitute the second feed stream into the extruder are similar to those used in preparing conventional solution coating compositions. The dispersions are made by conventional techniques such as sand grinding, pebble milling, or ball milling a mixture of the pigment and a small portion of the film-forming resin in a volatile liquid dispersing medium. Generally, an organic dispersing polymer having polar groups, such as cellulose acetate butyrate, is included in the mixture also to facilitate dispersion of the pigment.

Another method of preparing the pigment dispersion is by use of a two-roll mill. With this method, pigment and cellulose acetate butyrate are blended in a solvent for the cellulose acetate butyrate, and the resulting mixture is placed on a two-roll mill and milled to disperse the pigments and to form pigment chips. The chips are then blended in a volatile dispersing liquid with a minor portion of the film-forming resin or additional cellulose acetate butyrate to form a pigment dispersion.

Regardless of how the dispersion is formed, best results in the method of the present invention are obtained when the pigment dispersion is no more than 60% by total weight, preferably no more than 35% by total weight, of volatile liquid. The relative weights of the two feeds are set so that when the dispersion is mixed with the non-pigment constituents in the extruder, the weight of the liquid should be no more than 15% of the total weight of the material. When more than 15% of liquid is present, the efficiency of mixing in the extruder can decline.

The melt-extruders to which the method of the present invention relates should have at least two inlet ports and a melt zone, a mix zone, and preferably a devolatilization zone. In most conventional extruders, there also exists mechanical means to urge the material therethrough. These means preferably serve the additional function of mixing the melted material. The urging and mixing functions are often accomplished by a single or twin screw, for example. One example of a commercially available extruder to which the present invention is applicable is a Werner and Pfleiderer twin-screw 53 mm melt-extruder.

The non-pigment constituents are charged through the first inlet port into an unheated feed zone from which they are urged into the next area of the extruder herein designated as the melt zone. These constituents are here melted and at least partially blended as the melted material is urged through the zone.

Through the second inlet port, positioned in the extruder downstream of the position of the first inlet port, is introduced the pigment dispersion. For purposes of this invention, the point where the liquid dispersion is introduced to blend with the melted non-pigment constituents defines the beginning of the aforementioned mix zone. In this zone the non-pigment constituents are maintained in a molten state as they are being mixed with the pigment dispersion and urged through. The benefits of the improved method of this invention are primarily imparted during this mixing. The introduction of the pigment in an already well-dispersed form, the dispersion, to mix with the already melted non-pigment constituents allows more uniform pigmentation of the composition than do the previously-described methods of the prior art.

From the mix zone, the initimately blended constituents are urged to another zone within the extruder which is operated under a vacuum of about 10–26 inches of mercury. In this devolatilization zone, the liquid dispersant or solvent used in the pigment dispersion is removed, and a 100% solids extrudate is produced. The extrudate is then reduced to the final powder form using conventional grinding equipment such as a pin disc mill, a fluid energy mill, or a hammer mill. It is also possible to devolatilize the material in a separate operation after it has been removed from the extruder, but before grinding, although using an extruder with an internal devolatilization capability is preferred.

The non-pigment constituents will normally be loaded batchwise into a feed hopper but from there will be introduced into and passed through the extruder at a steady rate. The pigment dispersion should therefore be metered into the extruder to mix with the non-pigment constituents at a steady rate designed to produce the desired pigment-to-binder weight ratio in the extrudate and in the final powder coating.

The following control example illustrates the invention.

EXAMPLE

The following 2 ingredients are prepared as described:

| 1. Binder Materials Base | |
|---|---|
|  | Parts by weight |
| Copolymer of methyl methacrylate/butyl methacrylate/glycidyl methacrylate in a weight ratio of 50/34/16 (prepared as in Example 1 of U.S. Pat. No. 4,027,066 but subsequently filtered from solution and dried) | 74.5 |
| Dodecandedioic acid | 11.5 |
| Cellulose acetate butyrate, 55% butyryl content and 0.01 second viscosity by ASTM-D-1342-56 | 10.0 |
| Benzoin | 0.5 |
| Hexamethoxymethylmelamine | 4.0 |
| Blocked paratoluene sulfuric acid solution (10% by weight paratoluene sulfuric acid blocked with 30% by weight ERL-4221 in 60% by weight isopropanol) | 0.8 |
| Silicone | 0.5 |

The constituents are thoroughly dry blended to form a mixture of discrete particulates.

| 2. Pigment Dispersion | |
|---|---|
|  | Parts by weight |
| Toluene | 294.06 |
| Copolymer of methyl methacrylate/butyl methacrylate/glycidyl methacrylate (as described above) | 134.16 |
| Dispersant (copolymer of methyl methacrylate/butyl methacrylate in 50/50 weight ratio) | 39.78 |
| Titanium dioxide pigment | 1092.0 |

The above constituents are thoroughly blended together and then ground in a conventional sand mill to form a pigment dispersion having a solids contact of 81.2% containing 70% pigment.

The following two powder coating compositions are prepared as described:

POWDER COATING COMPOSITION A (CONTROL)

1000 parts by weight of Binder Material Base (ingredient 1 above) are thoroughly dry blended with 560 parts by weight of titanium dioxide pigment, giving a pigment-to-binder weight ratio of about 0.56. This blend is charged directly into a twin-screw melt extruder which operates at 200 RPM and is extruded at 90° C. The extrudate is cooled, broken into chips, and charged into a grinding mill where it is ground into a fine powder. The powder is then screened to eliminate particles over 53 microns and below 10 microns in size.

POWDER COATING COMPOSITON B

A total of 928 parts by weight of Binder Material Base (ingredient 1 above) are fed at a steady rate into the first barrel of a 9-barrel Werner and Pfleiderer twin-screw 53 mm melt extruder. Barrel 1 is at ambient temperature, barrels 2–3 are at 92° C., barrel 4 at 116° C., barrels 5–8 at 150° C., and barrel 9 at 105° C. A total of 714.8 parts by weight of the Pigment Dispersion (ingredient 2 above) are metered into the extruder between barrels 3 and 4 at a rate of 0.77 parts of Dispersion per part of Binder Materials Base passing through the extruder, providing a pigment-to-binder weight ratio of about 0.56. A vacuum of about 26 inches of mercury is applied to barrels 7 and 8 to remove the toluene, and the blend is extruded at 135° C. The extrudate is cooled, broken into chips, and ground into a fine powder. The powder is then screened to eliminate particles over 53 microns and below 10 microns in size.

Each of Powder Coating Compositions A and B is sprayed onto a steel panel primed with an alkyd resin primer. The panels are each heated for 30 minutes at 175°–180° C. to cure the powder into a smooth, even, finish.

The panel coated with control Powder Coating A exhibits a gloss, measured at 20°, of 64.7 and a distinctness-of-image of 50 (where a value of 100 is essentially a mirror-image). The panel coated with Powder Coating B exhibited a gloss, measured at 20°, of 73 and a distinctness-of-image of 85.

I claim:

1. An improved method of forming a pigmented powder coating composition, the composition containing at least binder materials and pigment in a pre-determined pigment-to-binder weight ratio and the method being of the kind wherein the constituents are melt-extruded and the extrudate subsequently reduced to a powder, wherein the improvement comprises
    (a) introducing a major portion of the non-pigment constituents in substantially dry form into a melt-extruder,
    (b) introducing into the melt extruder a pigment dispersion comprising the pigment, the balance of the non-pigment constituents, and at least some, up to 60% by weight, based on the dispersion weight, of a volatile dispersing liquid, the liquid dispersion being introduced at a point downstream of the introduction of the constituents of (a) to mix therewith and being introduced at a rate that will produce an extrudate having the pre-determined pigment-to-binder weight ratio, and
    (c) removing the volatile liquid.

2. The method of claim 1 in which the step of removing the volatile liquid is effected while the composition is in the extruder.

* * * * *